March 21, 1944. H. E. MILLS ET AL 2,344,717

RIVET

Filed April 17, 1942

Herbert E. Mills  
Vernon I. Mills   INVENTOR.

BY Edwin J. Balluff

Patented Mar. 21, 1944

2,344,717

UNITED STATES PATENT OFFICE 2,344,717

RIVET

Herbert E. Mills and Vernon I. Mills, Detroit, Mich.

Application April 17, 1942, Serial No. 439,318

18 Claims. (Cl. 85—40)

This invention relates to rivets and has particular reference to an improved form of rivet which is constructed and adapted so as to be inserted and set from one side of the work.

A principal object of the invention is to provide a new and improved form of rivet.

Another object of the invention is to provide a rivet of the type herein disclosed which is adapted to be set from the side on which it is inserted in the work and by the application of a mechanical force imparted to the head thereof.

Another object of the invention is to provide a rivet of the character herein disclosed and comprising a shell closed at one end and having a pin therein, the pin being adapted to expand the closed end of the rivet for setting the same and the other end of the pin and shell being provided with suitable means for interlocking the same.

Another object of the invention is to provide a rivet of the type herein disclosed which is constructed and arranged so that when set it will present a surface flush with the surface of the work to which it is secured.

Another object of the invention is to provide a rivet of the type herein disclosed with means for positively preventing the separation of the constituent parts thereof.

Other objects and advantages of the invention will be apparent from a consideration of the following specification taken in conjunction with the accompanying drawing, of which there is one sheet and wherein.

Figure 1:
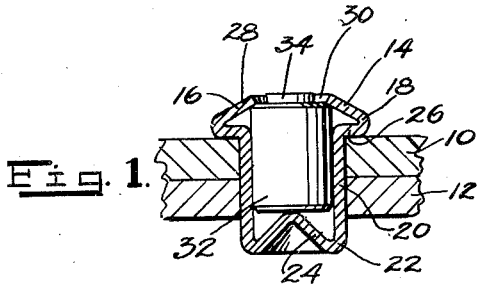
Fig. 1 is a cross sectional view illustrating a rivet embodying the invention after it has been inserted through a suitable hole in the material which is to be secured together but before the end of the rivet has been upset.
Figure 3:
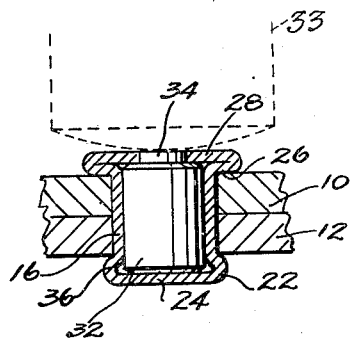
Fig. 3 is a view similar to Fig. 1 but showing the rivet after it has been set.
Figure 2:
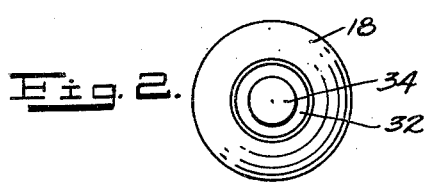
Fig. 2 is a plan view of the rivet shown in Fig. 1.

Referring now to Figs. 1, 2, and 3, there are illustrated two sheets of material 10 and 12 having an aperture therethrough. A rivet indicated generally at 14 is arranged in the aperture in the sheets 10 and 12 and comprises a hollow member or shell 16 formed to provide a head 18, a tubular shank 20, and a clinching portion 22. The bottom of the shell or member 16 is closed by an integral wall 24 which projects inwardly and toward the head of the rivet. The head 18 of the rivet is adapted to seat on the edge of the aperture through the sheets 10 and 12. The head 18 is formed by a laterally extending annular flange 26 projecting radially from one end of the shank portion 20 and from the outer edge of the flange 26 a second or return annular flange 28 projects inwardly and upwardly as illustrated in Fig. 1, the inner edge 30 of the flange 28 defining an aperture. Before the flange 28 is wholly formed a plunger or pin 32 is arranged in the member 16 and may rest upon the upper extremity or peak of the wall 24. The upper end of the pin 32 is provided with a reduced portion or boss 34 which is arranged in the opening defined by the inner edge 30 of the flange 28.

The clinching end 22 of the rivet is set by driving the pin 32 home, that is, by driving the pin 32 from the position illustrated in Fig. 1 to that illustrated in Fig. 3. A blow imparted to the boss 34 of the pin 32 by a tool such as a hammer 33 will drive the pin 32 downwardly into the shell 16, and when this is done the pin 32 will displace or flatten the wall 24 and thereby expand the clinching end 22 of the rivet to a form similar to that shown in Fig. 3 wherein an annular bead or rim 36 is provided which overlaps the edges of the aperture in the sheets 10 and 12 and thereby secures the rivet in position. In other words, by driving the pin 32 home the clinching end of the rivet is set for securing the rivet in place, thereby firmly to secure the two pieces of work 10 and 12 together. The wall 24 in flattening out under the pressure of the pin 32 will expand the lower end of the clinching portion 22 radially so as to form the bead 36, the metal in the wall 24 being sufficient to permit the expansion of the clinching portion 22 to aid in forming the bead 36. The wall 24 as illustrated in Fig. 1 is conical in shape and should be sufficiently flat so that pressure applied to the peak thereof by the pin 32 will react in a lateral direction with the clinching portion 22 so as to form the bead 36.

The flange 28 is folded downwardly and flattened against the flange 26 as illustrated in Fig. 3 when the pin 32 is driven home, the inner end of the flange 28 overlapping the end of the pin 32 around the boss 34 thereby positively to lock the pin 32 in the shell 16. The inner edge 30 of the flange 28 is brought up against the outer periphery of the boss 34 and may exert a gripping effect thereon. In view of the fact that the pin 32 is positively locked inside of the shell 16 after assembly and after the rivet has been set, a press fit between the pin 32 and the inside of the shell 16 is not necessary although the pin 32 should be of a size very close to that of the inside of the shell 16 in order that the pin 32 may back up the shell 16 to resist shearing thereof under lateral stresses between the sheets 10 and 12. Once the rivet has been set there is no possibility of the pin separating from the shell 16, and as the bottom of the shell is closed the rivet will not pass water from one side of the sheets 10 and 12 to the other side thereof. The wall 24 after being flattened out will support the bead 36 and prevent accidental or unintentional bending thereof. The shell 16 may be made by a stamping process.

Figure 4:
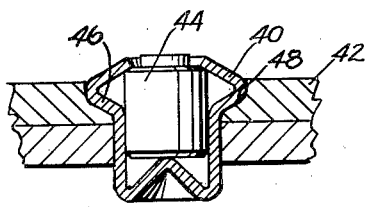
Fig. 4 is a view similar to Fig. 1 but illustrating a modified form of the invention.
Figure 5:
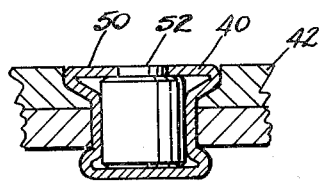
Fig. 5 is a view similar to Fig. 4 but illustrating the rivet therein disclosed after it has been set.

In the modification illustrated in Figs. 4 and 5, the head 40 of the rivet is arranged to fit in a counterbore or recess in the face of the sheet 42 around the aperture therein so that when the plunger 44 is driven home the head 40 of the recess will be flush with the surface of the sheet 42 as illustrated in Fig. 5. In order to obtain this result, the frusto-conical annular flange 46 is formed initially so as to seat against the surface of the counterbore 48 provided in the sheet 42 and when the pin 44 is driven home the return flange 50 at the top of the head 40 will lie substantially flush with the surface of the sheet 42, as well as flush with the end surface of the boss 52 on the end of the pin 44. Except for the shape of the flange 46, the construction of the rivet illustrated in Figs. 4 and 5 is the same as that illustrated in Figs. 1, 2 and 3, and may be set by exactly the same process. A flush rivet is sometimes desirable on certain types of work in order to reduce resistance and to lessen the possibility of accidental damage to the head of the rivet.

Figure 6:
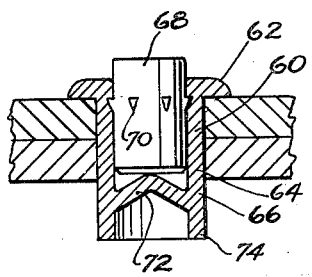
Fig. 6 is a view similar to Figs. 1 and 4, but illustrating a modified form of the invention.
Figure 7:
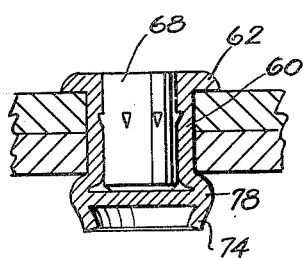
Fig. 7 is a view similar to Fig. 6 but showing the rivet therein illustrated after the same has been set.

In the modification illustrated in Figs. 6 and 7, the rivet comprises a shell 60 having an annular head 62, a shank 64, a clinching end 66, and a pin or plunger 68. The plunger 68 is provided with a plurality of wedge-shaped teeth 70 which are adapted to be embedded in the inside wall of the shell 60, the upper face of the teeth being flat and cooperating with the inside wall of the shell 60 in such a way as to prevent the pin 68 from separating from the shell 60. The pin 68 rests upon a wall 72 which is cone-shaped and integral with the side wall of the shell 60 and serving to close the shell 60 interiorly and adjacent the bottom thereof. The clinching end 66 of the shell 60 may be provided with an extension 74 which projects below the wall 72 and provides metal which helps to form the bead or rim 78 which is formed when the rivet is set. The rivet is set by driving the pin 68 home in a manner similar to that described in connection with the previous modifications, the teeth or lugs 70 functioning to hold the pin 68 in position.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

In all of the modifications of the invention illustrated and as previously set forth, the clinching end of the rivet is set by driving the pin or plunger home. In addition to expanding the clinching end of the rivet in order to form a rim or bead of larger diameter than the hole in which the rivet is arranged, the side walls of the hollow member or shell at the clinching end of the rivet are expanded radially so as to create a tight fit between the outside of the hollow member or shell and the hole in the work in which the rivet is arranged. This not only creates a tight fit between the rivet and the walls of the hole in which it is arranged, but also serves to provide a seal between the rivet and the wall of the hole in which the rivet is arranged thereby sealing the hole against passage of fluid therethrough. Similarly in the modifications illustrated in Figs. 1 to 5, flattening out of the return flanges tends to expand the wall of the shell or member at the head end of the rivet into a tight fit with the wall of the hole in which the rivet is arranged which with the annular bead formed by the outer periphery of the flanges of the head of the rivet functions to provide a seal between the rivet and the wall of the hole in which the rivet is arranged.

We claim:

1. A rivet adapted for securing a plurality of sheets of material together comprising a hollow tubular member having a head at one end thereof and an integral imperforate wall projecting inwardly and toward said head from the other end thereof, a pin at least partially within said member and engageable with the inner end of said inwardly projecting wall, said pin being permanently assembled with said member and movable relative thereto and toward said inwardly projecting wall so as to displace said inwardly projecting wall for setting said other end of said rivet, said pin being of such a length that it is substantially flush with the head of said rivet after the other end thereof is set.

2. A rivet adapted for securing a plurality of sheets of material together comprising a hollow tubular member having a head at one end thereof and an integral uninterrupted wall projecting inwardly and toward said head from the other end thereof, a pin at least partially within said member and engageable with the inner end of said inwardly projecting wall, said pin being permanently assembled with said member and movable relative thereto and toward said inwardly projecting wall so as to displace said inwardly projecting wall for setting said other end of said rivet, and means for positively locking said pin against movement in said member and against said inwardly projecting wall after said other end of said rivet has been set.

3. A rivet adapted for securing a plurality of sheets of material together comprising a hollow tubular member having a head at one end thereof and an integral continuous wall projecting inwardly and toward said head from the other end thereof, a pin at least partially within said member and engageable with the inner end of said inwardly projecting wall, said pin being permanently assembled with said member and movable relative thereto and toward said inwardly projecting wall so as to displace said inwardly projecting wall for setting said other end of said rivet, said member having a portion thereof arranged to engage said pin at the head end of said rivet for positively locking said pin against movement in said member and against said inwardly projecting wall after said other end of said rivet has been set.

4. A rivet adapted for securing a plurality of sheets of material together comprising a hollow tubular member having a head at one end thereof and an integral imperforate wall projecting inwardly and toward said head from the other end thereof, a pin at least partially within said member and engageable with the inner end of said inwardly projecting wall, said pin being permanently assembled with said member and movable relative thereto and toward said inwardly projecting wall so as to displace said inwardly projecting wall for setting said other end of said rivet, said head comprising a laterally extending flange and a return flange carried by said laterally extending flange, said return flange having an opening therein smaller than said pin and engaging the end of said pin for securing the same against movement in said member and against said inwardly projecting wall after said other end of said rivet has been set.

5. A rivet adapted for securing a plurality of sheets of material together comprising a hollow tubular member having a head at one end thereof and an integral uninterrupted wall projecting inwardly and toward said head from the other end thereof, a pin at least partially within said member and engageable with the inner end of said inwardly projecting wall, said pin being permanently assembled with said member and movable relative thereto and toward said inwardly projecting wall so as to displace said inwardly projecting wall for setting said other end of said rivet, said head comprising a laterally extending flange and a return flange carried by said laterally extending flange, said return flange having an opening therein smaller than said pin and engaging the end of said pin for securing the same against movement in said member and against said inwardly projecting wall after said other end of said rivet has been set, said pin having a boss which is arranged in said opening in said return flange and which is adapted to be gripped by the edge of said return flange.

6. A rivet adapted for securing a plurality of sheets of material together comprising a hollow tubular member having a head at one end thereof and an integral continuous wall projecting inwardly and toward said head from and closing the other end thereof, a pin at least partially within said member and engageable with the inner end of said inwardly projecting wall, said pin being permanently assembled with said member and movable relative thereto and toward said inwardly projecting wall so as to displace said inwardly projecting wall for setting said other end of said rivet, said head comprising a radially extending flange and a return flange carried thereby, said return flange engaging the end of said pin for locking the same against movement in said member and against said inwardly projecting wall after said other end of said rivet has been set, said pin being of such a length that it is substantially flush with the head of said rivet after the other end thereof is set.

7. A rivet adapted for securing a plurality of sheets of material together comprising a hollow tubular member having a head at one end thereof and an integral imperforate wall projecting inwardly and toward said head from the other end thereof, a pin at least partially within said member and engageable with the inner end of said inwardly projecting wall, said pin being permanently assembled with said member and movable relative thereto and toward said inwardly projecting wall so as to displace said inwardly projecting wall for setting said other end of said rivet, said head comprising a frusto-conical annular flange and a return flange carried thereby, said return flange being adapted when the rivet is set to be arranged flush with the surface of the work to which the rivet is secured.

8. A rivet adapted for securing a plurality of sheets of material together comprising a hollow tubular member having a head at one end thereof and an integral imperforate wall projecting inwardly and toward said head from the other end thereof, a pin at least partially within said member and engageable with the inner end of said inwardly projecting wall, said pin being adapted to be driven toward said inwardly projecting wall so as to displace said inwardly projecting wall for setting said other end of said rivet, said pin being provided with projections which are adapted to be embedded in the inner wall of said member for positively securing said pin and member in assembled relationship and against said wall after said other end of said rivet has been set.

9. A rivet comprising a hollow tubular member having a head at one end thereof and an integral uninterrupted wall projecting inwardly and toward said head from the other end thereof, a pin at least partially within said member and engageable with the inner end of said inwardly projecting wall, said pin being permanently assembled with said member and movable relative thereto and toward said inwardly projecting wall so as to displace said inwardly projecting wall for setting said other end of said rivet, said inwardly projecting wall being spaced from the lower end of said hollow member.

10. A rivet comprising a hollow member having a head at one end thereof and an integral wall projecting inwardly and toward said head from the other end thereof, said other end thereof comprising a clinching end which is closed by said inwardly projecting wall, a pin permanently assembled within said member and movable relative thereto and engageable with the inner end of said inwardly projecting wall, said pin being adapted to be displaced away from the head end of said member so as to flatten out said inwardly projecting wall in order to expand said clinching end of said hollow member to form an annular rim of larger diameter than the hole in which said rivet is arranged, said pin being of such a length that it is substantially flush with the head of said rivet after the other end thereof is set.

11. A rivet comprising a hollow member having a head at one end thereof and an integral imperforate wall projecting inwardly and toward said head from the other end thereof, said other end thereof comprising a clinching end which is closed by said inwardly projecting wall, a pin permanently and movably assembled within said member and engageable with the inner end of said inwardly projecting wall, said pin being adapted to be displaced away from the head end of said member so as to flatten out said inwardly projecting wall in order to expand said clinching end of said hollow member to form an annular rim of larger diameter than the hole in which said rivet is arranged, and means for positively locking said pin against movement in said member and against said inwardly projecting wall after said clinching end of said rivet has been expanded.

12. A rivet comprising a hollow member having a head at one end thereof and an integral wall projecting inwardly and toward said head from the other end thereof, said other end thereof comprising a clinching end which is closed by said inwardly projecting wall, a pin permanently and movably assembled within said member and engageable with the inner end of said inwardly projecting wall, said pin being adapted to be displaced away from the head end of said member so as to flatten out said inwardly projecting wall in order to expand said clinching end of said hollow member to form an annular rim of larger diameter than the hole in which said rivet is arranged, said member having a portion thereof arranged to engage said pin at the head end of said rivet for positively locking said pin against movement in said member and against said inwardly projecting wall after said clinching end of said rivet has been expanded.

13. A rivet comprising a hollow member having a head at one end thereof and an integral wall projecting inwardly and toward said head from the other end thereof, said other end thereof comprising a clinching end which is closed by said inwardly projecting wall, a pin permanently and movably assembled within said member and engageable with the inner end of said inwardly projecting wall, said pin being adapted to be displaced away from the head end of said member so as to flatten out said inwardly projecting wall in order to expand said clinching end of said hollow member to form an annular rim of larger diameter than the hole in which said rivet is arranged, said head comprising a laterally extending flange and a return flange carried by said laterally extending flange, said return flange having an opening therein smaller than said pin and engaging the end of said pin for securing the same against movement in said member and against said inwardly projecting wall after said clinching end of said rivet has been expanded.

14. A rivet comprising a hollow member having a head at one end thereof and an integral wall projecting inwardly and toward said head from the other end thereof, said other end thereof comprising a clinching end which is closed by said inwardly projecting wall, a pin permanently and movably assembled within said member and engageable with the inner end of said inwardly projecting wall, said pin being adapted to be displaced away from the head end of said member so as to flatten out said inwardly projecting wall in order to expand said clinching end of said hollow member to form an annular rim of larger diameter than the hole in which said rivet is arranged, said head comprising a laterally extending flange and a return flange carried by said laterally extending flange, said return flange having an opening therein smaller than said pin and engaging the end of said pin for securing the same against movement in said member and against said inwardly projecting wall after said clinching end of said rivet has been expanded, said pin having a boss which is arranged in said opening in said return flange and which is adapted to be gripped by the edge of said return flange.

15. A rivet comprising a hollow member having a head at one end thereof and an integral wall projecting inwardly and toward said head from the other end thereof, said other end thereof comprising a clinching end which is closed by said inwardly projecting wall, a pin permanently and movably assembled within said member and engageable with the inner end of said inwardly projecting wall, said pin being adapted to be displaced away from the head end of said member so as to flatten out said inwardly projecting wall in order to expand said clinching end of said hollow member to form an annular rim of larger diameter than the hole in which said rivet is arranged, said head comprising a radially extending flange and a return flange carried thereby, said return flange engaging the end of said pin for locking the same against movement in said member and against said inwardly projecting wall after said clinching end of said rivet has been expanded.

16. A rivet comprising a hollow member having a head at one end thereof and an integral continuous wall projecting inwardly and toward said head from the other end thereof, said other end thereof comprising a clinching end which is closed by said inwardly projecting wall, a pin within said member and engageable with the inner end of said inwardly projecting wall, said pin being adapted to be displaced away from the head end of said member so as to flatten out said inwardly projecting wall in order to expand said clinching end of said hollow member to form an annular rim of larger diameter than the hole in which said rivet is arranged, said pin being provided with projections which are adapted to be embedded in the inner wall of said member for positively securing said pin and member in assembled relationship and against said wall after said other end of said rivet has been set.

17. A rivet comprising a hollow member having a head at one end thereof and an integral wall projecting inwardly and toward said head from the other end thereof, said other end thereof comprising a clinching end which is closed by said inwardly projecting wall, a pin permanently and movably assembled within said member and engageable with the inner end of said inwardly projecting wall, said pin being adapted to be displaced away from the head end of said member so as to flatten out said inwardly projecting wall in order to expand said clinching end of said hollow member to form an annular rim of larger diameter than the hole in which said rivet is arranged, the lower end of said hollow member projecting beyond said wall.

18. A rivet comprising a hollow tubular member having a head at one end thereof and an integral continuous clinching portion closing the other end thereof, a pin at least partially within said member and cooperable with said clinching portion of said rivet for expanding the same under the action of pressure applied to said pin from the head side of said rivet, said hollow member and pin being constructed and arranged relative to each other so that when pressure is applied to said pin for setting the rivet, the side wall of said hollow member will be expanded circumferentially by stretching so as to form a tight fit with the wall of the hole in the work in which the rivet is arranged, said pin being of such a length that it is substantially flush with the head of said rivet after the other end thereof is set.

HERBERT E. MILLS.
VERNON I. MILLS.